US006681176B2

(12) United States Patent
Funk et al.

(10) Patent No.: US 6,681,176 B2
(45) Date of Patent: Jan. 20, 2004

(54) METHOD AND DEVICE FOR A DETACHABLE NAVIGATION SYSTEM

(75) Inventors: Karsten Funk, Mountain View, CA (US); Hauke Schmidt, East Palo Alto, CA (US); Manfred Moellendorf, Los Altos, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/139,023

(22) Filed: May 2, 2002

(65) Prior Publication Data

US 2003/0208314 A1 Nov. 6, 2003

(51) Int. Cl.$^7$ .................. G01C 21/26; G01C 22/00
(52) U.S. Cl. ............ 701/207; 701/211; 701/214; 340/995.2
(58) Field of Search ............... 701/207, 208, 701/209, 210, 211, 212, 213, 201, 202, 49; 340/990, 995; 342/357.01, 357.12, 357.1, 357.14

(56) References Cited

U.S. PATENT DOCUMENTS

| | | | | |
|---|---|---|---|---|
| 4,204,255 A | * | 5/1980 | Cremer .................... 701/49 |
| 5,555,491 A | * | 9/1996 | Tao ...................... 361/686 |
| 5,760,742 A | * | 6/1998 | Branch et al. ........... 342/457 |
| 5,794,164 A | * | 8/1998 | Beckert et al. ......... 455/3.06 |
| 5,910,882 A | * | 6/1999 | Burrell .................. 361/681 |
| 6,124,826 A | * | 9/2000 | Garthwaite et al. .... 342/357.09 |
| 6,125,326 A | * | 9/2000 | Ohmura et al. .......... 701/213 |
| 6,324,594 B1 | * | 11/2001 | Ellis et al. ............... 710/5 |
| 6,333,711 B1 | * | 12/2001 | Suyama ............... 342/357.14 |
| 6,427,115 B1 | * | 7/2002 | Sekiyama ................ 701/208 |
| 6,526,351 B2 | * | 2/2003 | Whitham ................ 701/211 |

* cited by examiner

*Primary Examiner*—Tan Q. Nguyen
(74) *Attorney, Agent, or Firm*—Kenyon & Kenyon

(57) ABSTRACT

A faceplate including an antenna for receiving navigation signals, a processor electrically coupled to the antenna for determining a position, a display electrically coupled to the processor for displaying navigation information, and at least one input arrangement. The faceplate able to be installed on a front side of a vehicular electronic unit in a dashboard of a vehicle. The at least one input arrangement controlling the vehicular electronic unit when the faceplate is received on the front side of the vehicular electronic unit. A system for navigating including a handheld unit. The handheld unit includes an antenna, a processor electrically coupled to the antenna, and a display electrically coupled to the processor. A further antenna is situated on a vehicle and a receptacle is situated in a dashboard of the vehicle for receiving the handheld unit. The receptacle electrically couples the further antenna to the handheld unit when the handheld unit is received in the receptacle. The handheld unit operates to navigate a user in a stand-alone capacity and operates to navigate a driver of the vehicle when the handheld unit is received in the receptacle. A method for navigating a pedestrian, navigating a driver, and securing a vehicular electronic component is provided. The method includes determining by a processor whether a handheld unit is received in a dashboard receptacle. The processor is situated in the handheld unit and electrically coupled to an antenna situated in the handheld unit. The processor is electrically coupled to a display situated in the handheld unit. The dashboard receptacle is situated in the vehicle. Navigating the pedestrian using the antenna if the handheld unit is not received in the dashboard receptacle. Navigating the driver using a further antenna if the handheld unit is received in the dashboard receptacle. The further antenna is situated on the vehicle.

35 Claims, 4 Drawing Sheets

METHOD AND DEVICE FOR A DETACHABLE NAVIGATION SYSTEM

FIELD OF THE INVENTION

The present invention generally regards navigation systems and security systems for vehicular electronics. More particularly, the present invention regards the integration of a personal navigation system, a vehicular navigation system, and a faceplate security system for a vehicular electronic system.

BACKGROUND INFORMATION

Navigation systems are gaining more and more acceptance within the consumer market with increasing device availability, increasing device reliability, and lower prices. Generally, there have been two markets for navigation devices: the automotive market where the navigation system is mainly used to get driving directions; and the outdoor market where the navigation system is mainly used to find a way through nature (for instance, in national parks, forests, etc.). Both markets have developed very specific devices to serve exactly these needs. Therefore, a user interested in both hiking and driving directions is forced to buy two units with almost the same components.

With respect to vehicular electronic systems, some car stereo systems provide detachable faceplates as theft prevention. These detachable faceplates can be removed to prevent potential thieves from attempting to steal the car stereo, since the car stereo is of no use without the faceplate. This method may therefore rely on two basic facts for the method to be effective. First, that it is apparent from outside the vehicle when the faceplate is removed, and second, that it is generally commonly known that a car stereo without a faceplate is inoperative. Therefore, when a potential thief looks into a vehicle and sees that a faceplate is removed, there is no longer a valuable stereo to steal. The faceplate may include a display, functional buttons, and possibly even a microprocessor, but it is useless without the part built into the car. Therefore, the user must carry a useless piece (the faceplate) out of the car and carry it just to prevent the other part (the remainder of the stereo) from being stolen.

There are navigation systems available which fit in the DIN (Deutsche Institut fuer Normung, a member of International Organization for Standardization) slot of an ordinary car stereo. These in-car navigation systems provide vehicle position and direction information to a driver or other vehicle occupant. This navigation information may include turn-by-turn navigation (i.e., the navigation system tells the user in advance if the user has to turn at an upcoming intersection).

GPS receivers for outdoor use may include a display, functional buttons, a microprocessor, a battery, and a GPS receiver. Several models are available on the market. Outdoor GPS receivers may be capable of showing map information.

Therefore, what is needed is a device that provides theft protection via a detachable faceplate and that also provides the functionality of a handheld navigation device useful for non-automotive applications.

SUMMARY OF THE INVENTION

A system and method for a detachable navigation system is provided. A faceplate includes an antenna for receiving navigation signals, a processor electrically coupled to the antenna for determining a position, a display electrically coupled to the processor for displaying navigation information, and at least one input arrangement. The faceplate is able to be installed on a front side of a vehicular electronic unit in a dashboard of a vehicle. The at least one input arrangement controls the vehicular electronic unit when the faceplate is received on the front side of the vehicular electronic unit. A system for navigating includes a handheld unit. The handheld unit includes an antenna, a processor electrically coupled to the antenna, and a display electrically coupled to the processor. A further antenna is situated on a vehicle and a receptacle is situated in a dashboard of the vehicle for receiving the handheld unit. The receptacle electrically couples the further antenna to the handheld unit when the handheld unit is received in the receptacle. The handheld unit operates to navigate a user in a stand-alone capacity and operates to navigate a driver of the vehicle when the handheld unit is received in the receptacle. A method for navigating a pedestrian, navigating a driver, and securing a vehicular electronic component is provided. The method includes determining by a processor whether a handheld unit is received in a dashboard receptacle. The processor is situated in the handheld unit and electrically coupled to an antenna situated in the handheld unit. The processor is electrically coupled to a display situated in the handheld unit. The dashboard receptacle is situated in the vehicle. The method provides for navigating the pedestrian using the antenna if the handheld unit is not received in the dashboard receptacle. The method provides for navigating the driver using a further antenna if the handheld unit is received in the dashboard receptacle. The further antenna is situated on the vehicle.

DETAILED DESCRIPTION

Figure 1:
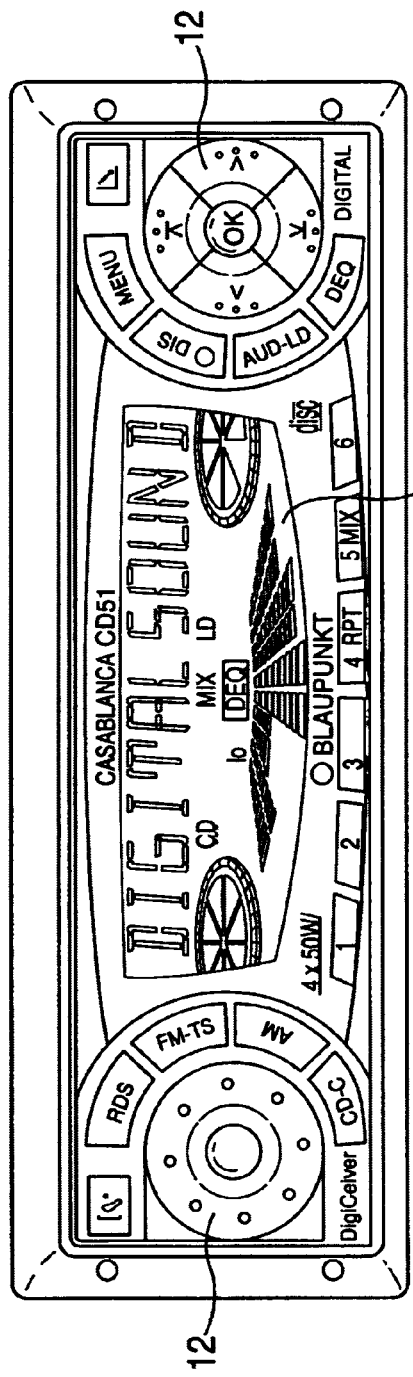
FIG. 1 illustrates a vehicle stereo system in the prior art.

FIG. 1 shows vehicle stereo system 10, which may be a radio, cassette player, CD player, CD magazine controller, or any combination of the above. Stereo system 10 includes a display 11 and input controls 12 for controlling the functions of stereo 10.

Figure 2:
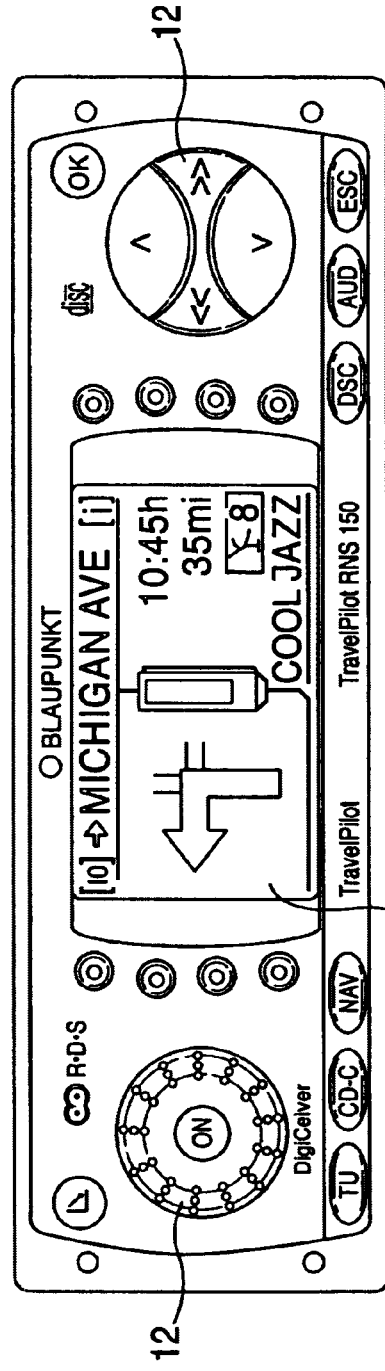
FIG. 2 illustrates a navigation device configured to fit in a DEN slot of a vehicle in the prior art.

FIG. 2 shows navigation device 20 configured to fit in a vehicle DIN slot. DIN stands for Deutsche Institut fuer Normung, which is a member of International Organization for Standardization (ISO). The United States counterpart to the Deutsche Institut fuer Normung is the American National Standards Institute (ANSI), which is also a member of the ISO. Navigation device 20 may also operate a CD player (not shown), which may be accessible by folding down the front face to access the slot for the CD situated behind the front face. Navigation device 20 may provide navigation information to a driver in the form of a diagram of future driving directions in display 11. Display 11 may show upcoming turns in a diagrammatic form indicating right or left turns and showing cross-streets. Additionally, display 11 may show a distance to, or estimated time until, the indicated turn. Navigation device 20 has input controls 12 for controlling both the navigation device and the CD player.

Figure 3:
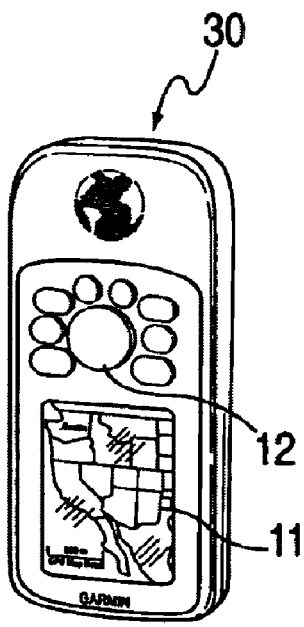
FIG. 3 illustrates a handheld navigation device in the prior art.

FIG. 3 shows handheld navigation device 30 having display 11 and input controls 12. Handheld navigation device 30 is a GPS receiver including an antenna (not shown), processor (not shown), display 11, and memory (not shown).

Figure 4:
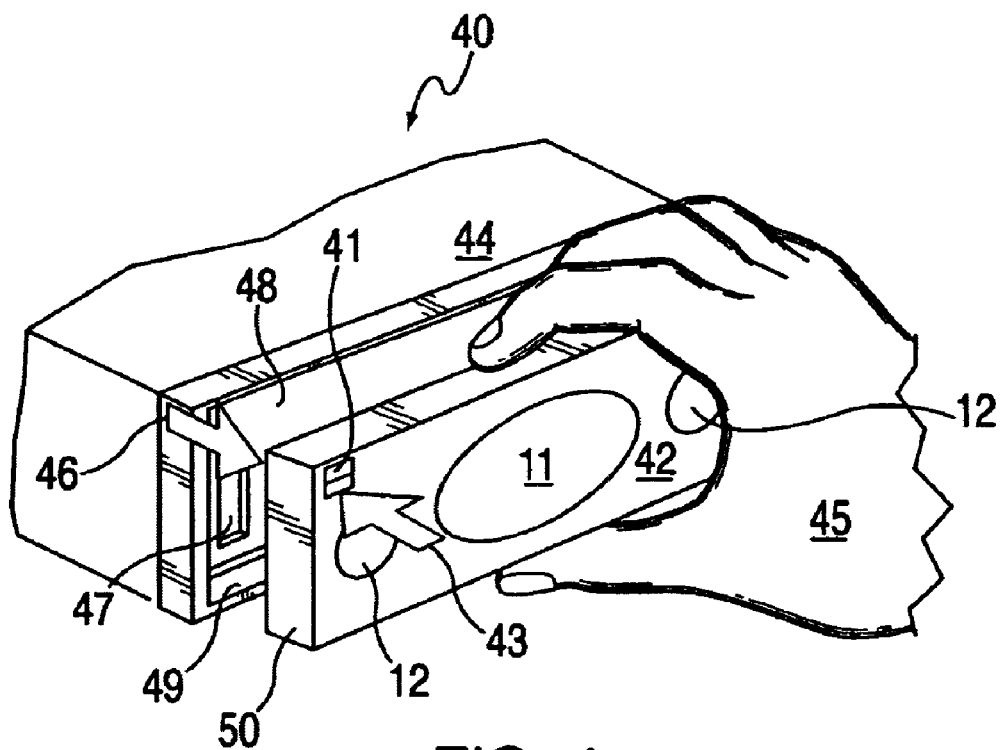
FIG. 4 illustrates a faceplate security system for a vehicle electronic system according to the present invention.

FIG. 4 shows an embodiment of the present invention showing the operation of a detachable faceplate navigation security system. Vehicle electronic unit 40 is adapted to fit in a DIN slot for a vehicle electronic system. Alternatively, vehicle electronic unit 40 may be adapted to fit in any other slot, either standardized or custom, for any vehicle electronic system. By actuating button 41 in the direction of arrow 43, user 45 is able to disengage handheld unit 42 from electronic unit body 44 in the direction of arrow 46. User 45 is able to completely separate handheld unit 42 from electronic unit body 44 in this manner and to thereby render vehicle electronic unit 40 inoperative. Additionally, it may be obvious from the exterior of the vehicle (not shown), or at least from directly in front of vehicle electronic unit 40, that handheld unit 42 has been removed. Since it may be common knowledge that electronic unit body 44 is useless without handheld unit 42, there is no motivation to steal electronic unit body 44 for either another use or for resale. Therefore, the removal of handheld unit 42 may provide an effective deterrent to the theft of vehicle electronic unit body 44.

Handheld unit 42 may be replaced on the front side of electronic unit body 44 upon returning to the vehicle or at any time that user 45 wishes to use vehicle electronic unit 40. User 45 simply aligns four edges 50 of handheld unit 42 with four sidewalls 49 of dashboard receptacle 48 and presses handheld unit 42 into position thereby automatically engaging locking mechanism 47. Locking mechanism 47 and the alignment of edges 50 with sidewalls 49 creates a firm engagement between handheld unit 42 and electronic unit body 44.

Handheld unit 42 may be a navigation unit which may be used as an in-car navigation unit when it is attached to electronic unit body 44 built into the car (not shown). If handheld unit 42 is detached from electronic unit body 44, handheld unit 42 operates as a handheld navigation unit for hiking or pedestrian navigation. For handheld purposes, handheld unit 42 may provide walking directions, for example, either through national parks or within cities (for example, providing to user 45 a route from a parking garage to the building, restaurant, or address).

Handheld unit 42 may include a built-in GPS receiver and a built-in antenna which may provide satellite reception when handheld unit 42 is detached from electronic unit body 44. If attached to electronic unit body 44, an external antenna (not shown) mounted, for example, on the car's roof, may provide satellite reception. This external antenna may connect to handheld unit 42 through electrical contacts (not shown). Alternative methods for navigating may also be included in either handheld unit 42 or electronic unit body 44 instead of or in addition to a GPS receiver. For instance, the invention may use DGPS (Differential GPS), AGPS (Assisted GPS), triangulation, hyperbolic intersection of time-delay solutions, and cell identification to position user 45.

Handheld unit 42 may have a memory (not shown) which may be nonvolatile memory and which may be either removable (for instance a memory card or memory stick) or which may be permanently installed in handheld unit 42. This built-in map storage in handheld unit 42 may hold map data to navigate in a pedestrian mode of operation. The complete map data may be stored on a CD-Rom (not shown) installed in the vehicle and electrically coupled to electronic unit body 44. The CD-Rom may be a permanently installed CD-Rom or an exchangeable CD-Rom. Handheld unit 42 may constantly update the map data held in this memory with the surrounding area maps while handheld unit 42 is attached to electronic unit body 44. Therefore, in the event of detaching the unit, user 45 may take exactly the map data with him that is needed. Either user 45 or handheld unit 42 may define the size of the area the map data covers that is held in the built-in memory of handheld unit 42. Alternatively, user 45 may direct handheld unit 42 to download a different region of map coverage which is remote from the location of the vehicle at the time of detachment. This may be useful when user 45 is taking handheld unit 42 on any type of trip involving another mode of transportation (for example, by plane, train, or boat). Additionally, user 45 may direct handheld unit 42 to download a set of maps designed to provide map coverage along a specific trail (for traveling by foot) or a specific road (for traveling in another vehicle (not shown) that does not have a navigation system). A personal computer may include a docking station and the docking station may be adapted to receive handheld unit 42. The docking station may be electrically coupled to the personal computer and the memory of handheld unit 42 when handheld unit 42 is received in the docking station. When handheld unit 42 is received in the docking station, handheld unit 42 may be able to download map information from the personal computer and may be able to upload position information to the personal computer.

Display 11 may provide map information or directions in the form of arrows showing streets and cross-streets, two-dimensional maps and three-dimensional maps. For instance, for in-vehicle navigation, display 11 may show a forward-looking view from the driver's perspective. The street that the vehicle is traveling on may be displayed as a vertical line, and cross-streets may be shown as horizontal lines, with the cross-streets that are more distant from the front of the vehicle represented higher on the vertical line. In this way, a driver perspective diagram is achieved. Anticipated turns may be shown in this type of diagram by either a right- or left-handed arrow onto the desired cross-street. Display 11 may additionally show a distance until the anticipated turn, an estimated time until the turn, and/or a number of cross-streets before the turn. Two-dimensional maps may be useful for pedestrian navigating and may show streets, rivers, mountains, and other landmarks. Two-dimensional maps may also include topographic symbols representing altitude, or alternatively, altitude information may be provided as a number indicating the altitude of the user. Three-dimensional maps may include models which include features such as buildings, thereby enabling the user to become oriented by recognizing buildings by size and/or shape. Additionally, mapping by use of models may allow the user to navigate within a building, showing different floors and specific services on each floor (e.g., elevator, fire escape, etc.). Navigating inside with handheld unit 42 may require either a clear positioning signal and/or an accurate inertial guidance from the last position signal recieved. Alternative map styles may be provided by display 11.

A built-in battery (not shown) may be used to power handheld unit 42. This battery may be charged while the unit is attached to electronic unit body 44. Alternatively, this battery may be removable and replaceable. Additionally, a combination of rechargeable and replaceable batteries may be used in handheld unit 42.

Inertial sensors (not shown) may be included in handheld unit 42. These inertial sensors may be, for example, accelerometers or angular velocity sensors. These inertial sensors may provide inertial information if the GPS receiver does not get satellite reception (e.g. indoors). Additionally, inertial sensors may be provided in the vehicle and connect to electronic unit body 44 to provide inertial information while the navigation system is used in a driving mode. This additional inertial information may be useful to improve the quality of the navigation information and to provide navigation information in an area of low or no satellite coverage (e.g., in a parking garage or tunnel).

Handheld unit 42 may include a portable AM/FM receiver or an MP3 player for playing music while user 45 is away from the vehicle. The speaker (not shown) may be either a built-in speaker or may be a headphone or ear bud.

Handheld unit 42 may also include cell phone functionality enabling user 45 to make telephonic communications while away from the vehicle. This embodiment may be particularly advantageous by combining the cell phone with the navigation device and thereby reducing the number of electronic accessories user 45 must carry. Additionally, as noted above, a cell identification system or triangulation method using cell phone base stations may be used to position the user, thereby reducing the amount of additional electronics needed in handheld unit 42. The speaker for the cell phone may be either built-in or may be a headphone or ear bud. Similarly, handheld unit 42 may also include an instant messaging or text messaging device (e.g., pager, ICQ client, AOL Instant Messenger client, etc.).

Additionally, handheld unit 42 may include a game console thereby enabling user 45 to have a game to play while away from the vehicle. Similarly, handheld unit 42 may include any number of other electronic accessories that might be useful to user 45, including but not limited to an electronic dictionary and an electronic translating device.

Handheld unit 42 may store the personal profile of user 45. This profile may include car stereo adjustments (e.g. radio station presets), car and convenience adjustments (e.g., driver seat adjustment, temperature presets, etc.) as well as personal information (e.g., address book, phone numbers, etc.). In this situation, there may be more than one handheld unit 42 compatible with each electronic unit body 44. In this manner, each of the potential drivers of a vehicle (including user 45) might have their own handheld unit 42 for personal navigation, including individualized points of interest and preset waypoints for traveling, hiking, or driving. Additionally, each driver may be able to use a particular vehicle and the electronics associated with electronic unit body 44 in the particular vehicle without exchanging handheld unit 42. In this instance, each handheld unit 42 includes individualized car stereo adjustments and individualized car and convenience adjustments. Therefore, when each driver inserts their handheld unit 42 into electronic unit body 44, the vehicle is instantly customized to their personal tastes. Additionally, electronic unit body 44 may accept any handheld unit 42 that is physically compatible with the receptacle of electronic unit body 44, but may additionally require that a security code be entered to enable electronic unit body 44 to operate.

Electronic unit body 44 may define dashboard receptacle 48, in which handheld unit 42 is received. When handheld unit 42 is received in dashboard receptacle 48, electrical contacts (not shown) on electronic unit body 44 may connect with electrical contacts (not shown) on handheld unit 42. These connections may electrically couple the processor (not shown) of handheld unit 42 to the vehicle antenna (not shown). Additionally, this connection may electrically couple to the handheld unit 42 and the processor therein any of an inertial sensor (not shown) in the vehicle, an electronic control unit (not shown) in the vehicle, and a power source (not shown, and for example the vehicle battery). The additional information available to the processor of handheld unit 42 through electrical contacts may be used in navigational computations to provide increased accuracy.

Figure 5:
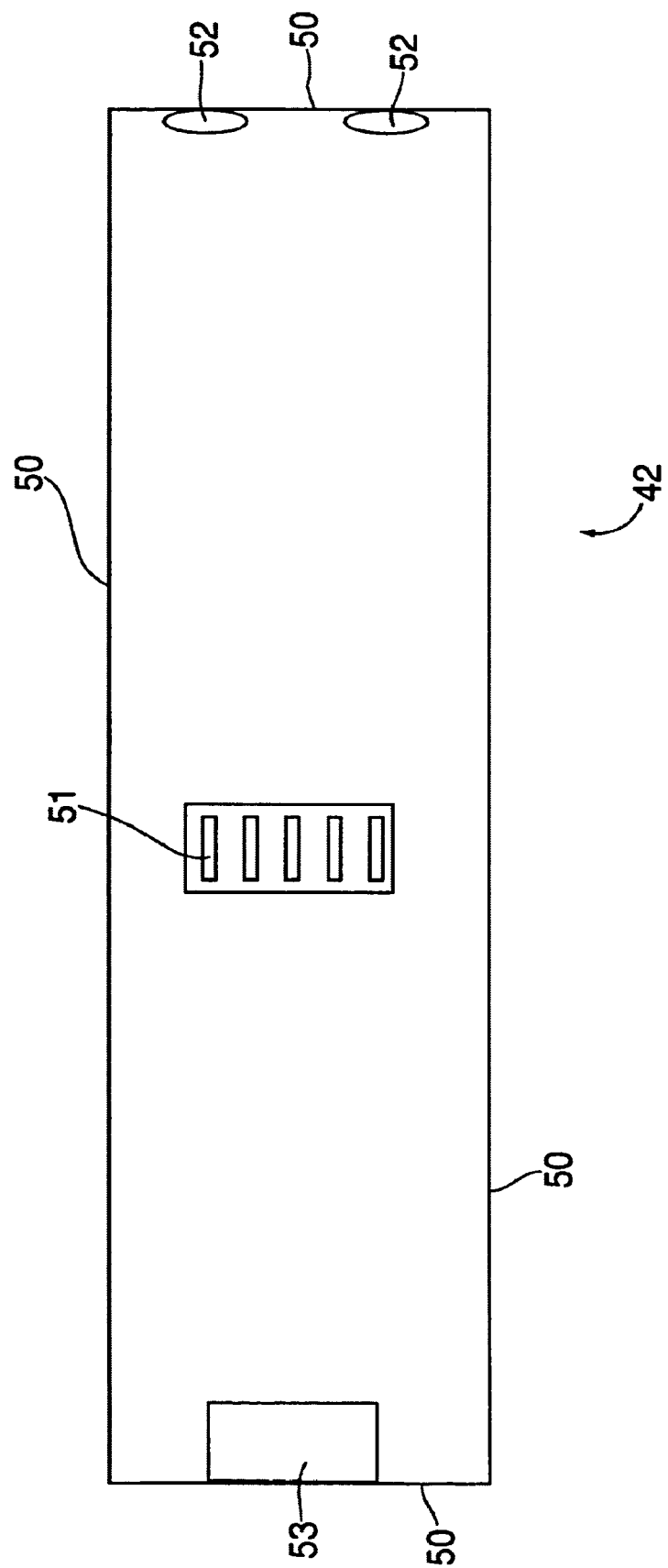
FIG. 5 illustrates a backside of a handheld navigation device for a vehicle electronic system according to the present invention.

FIG. 5 illustrates a backside of a handheld navigation device for a vehicle electronic system according to the present invention. Handheld unit 42 is held in position within a dashboard receptacle by a combination of elements including hooks 52 on one edge (or alternatively on any other edge) interacting with holes in the dashboard receptacle. Also holding handheld unit 42 in place is releasable locking mechanism 53 which interacts with the locking mechanism in the dashboard receptacle. Releasable locking mechanism 53 is controlled by the release button on the frontside of handheld unit 42. Aligning handheld unit 42 with the dashboard receptacle is the engagement between edges 50 and the sidewalls of the dashboard receptacle. When positioned in the dashboard receptacle, electrical contacts 51 of handheld unit 42 come into contact with electrical contacts in the dashboard receptacle. Electrical contacts 51 carry both power and signals between handheld unit 42 and the electronic unit body. The power carried through electrical contacts 51 may include power for operating the microprocessor, display, or other systems in handheld unit 42, and may also be for recharging batteries of handheld unit 42 for operating handheld unit 42 in a stand-alone capacity. The signals carried through electrical contacts 51 may include navigation signals received in a vehicle antenna communicated to the microprocessor of handheld unit 42 for calculating navigation information. The signals carried through electrical contacts 51 may also include control signals from the input controls on the frontside of handheld unit 42 for the operation of the vehicle electronic unit.

Figure 6:
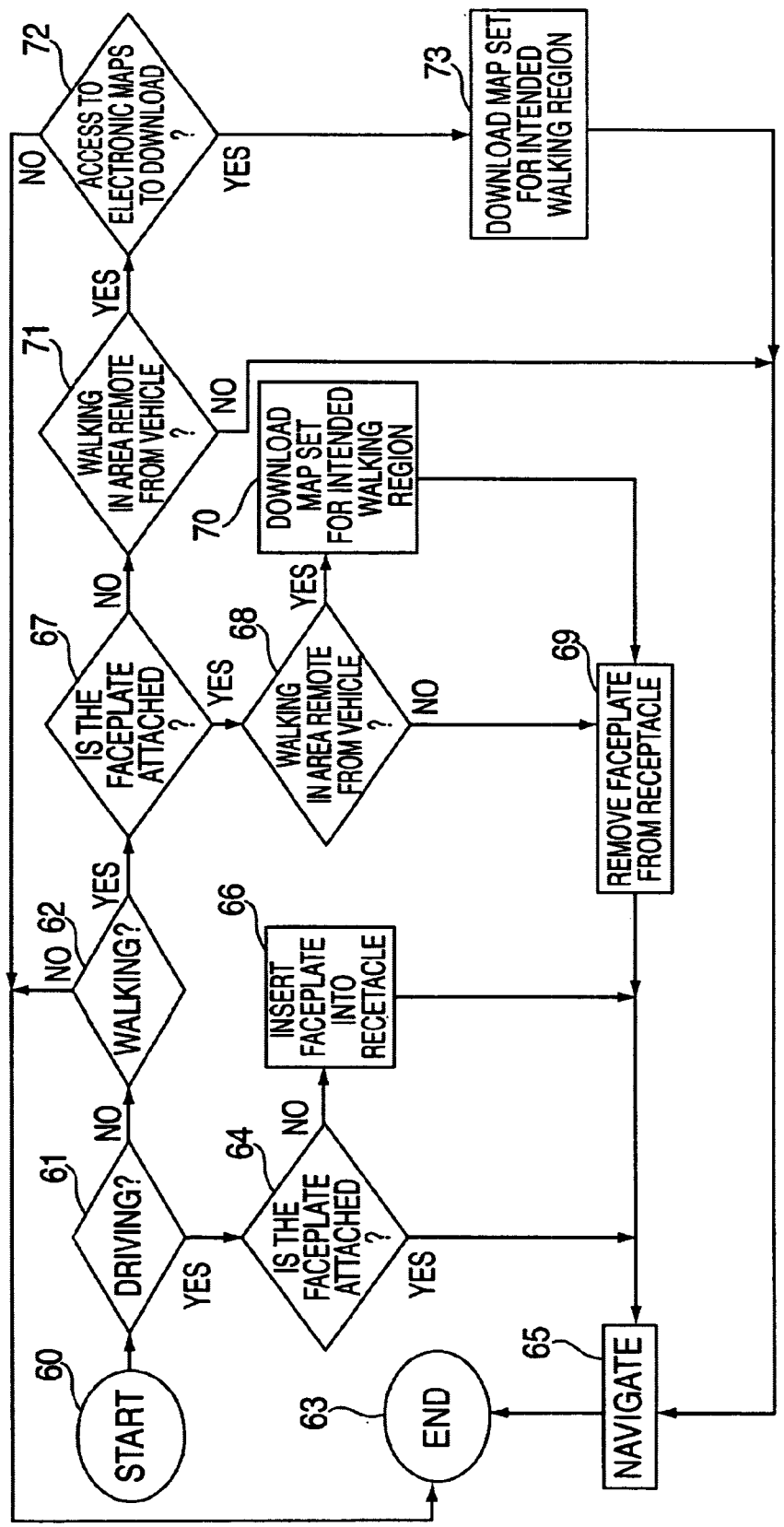
FIG. 6 illustrates a flowchart for a method according to the present invention.

FIG. 6 is a flowchart showing a method according to the present invention. The flow starts in circle 60 and proceeds to diamond 61 for the query whether the use is for driving. If the answer to the query in diamond 61 is negative, then the flow proceeds to diamond 62, which queries whether the use is for walking. If the answer to the query in diamond 62 is negative, then the flow proceeds to end circle 63. If, however, the answer to the query in diamond 61 is affirmative, then the flow proceeds to diamond 64, which queries whether the faceplate is attached. If the answer to the query in diamond 64 is affirmative, then the flow proceeds to box 65 which indicates the action of navigating. This flow represents the situation in which a driver is in the vehicle and the faceplate is attached so the system is ready to navigate. Therefore, from box 65 in which the user navigates, the flow proceeds to circle 63, which is the end. If the answer to the query in diamond 64 is negative, the flow proceeds to box 66 which indicates that the faceplate is inserted into the receptacle. This flow describes the situation in which, for instance, a driver returns to the vehicle after having used the faceplate as a pedestrian or personal navigation device and is preparing to drive the vehicle and desires to use the navigation device in the vehicle. The driver therefore inserts the navigation device into the dashboard receptacle and is thereafter able to use the navigation device for vehicular navigation. As described above, insertion of the detachable navigation device into the dashboard receptacle connects the handheld navigation device to a vehicle antenna which enables the navigation device to function as a vehicle navigation device. From box 66, the flow proceeds again to box 65 in which the user navigates using the device, and subsequently to end circle 63.

If the answer to the query in diamond 62 is affirmative, the flow proceeds to diamond 67, which queries whether the faceplate is attached. If the answer to the query in diamond 67 is in the affirmative, then the flow proceeds to diamond 68, which poses the query whether the user is walking in an area remote from the vehicle. If the answer to the query posed in diamond 68 is in the negative, then the flow proceeds to box 69, in which the user detaches the faceplate from the receptacle. This flow represents the situation in which the user is leaving the vehicle (the intended use is walking but the faceplate is attached), and the user plans to be walking in the area of the vehicle. Therefore, as described above with respect to the memory of the handheld device, a set of maps for the area surrounding the vehicle has been automatically loaded into the memory of the detachable faceplate navigation device, and therefore no further action is necessary for the user to utilize the navigation device in a handheld mode of operation. From box 69, the flow proceeds to box 65 in which the user navigates, and from there to end circle 63.

Alternatively, if the answer to the query posed in diamond 68 is in the affirmative, then the flow proceeds to box 70, in which the user downloads a map set for the intended walking region. This flow represents the scenario in which the user desires to use the handheld navigation device in an area remote from the position of the vehicle at the time of detaching the faceplate from the receptacle. One situation in which this scenario arises is when the user is at the airport and is flying to another area and wishes to use the handheld navigation device in that area. Another scenario where the user may desire to select a specific map set for loading into the detachable faceplate navigation device is when the user plans to hike for a long distance, perhaps several days, and therefore needs a map set catered to the specific area in which the user plans to travel, for instance along a specific trail. Since the map set loaded into the handheld navigation device by default may be the area surrounding the vehicle (based on the assumption that generally a user will use the handheld navigation device in the area around the vehicle), it is therefore necessary to direct the device to load a map set for the remote area. This loading of user-directed map data is accomplished in box 70. From there the flow proceeds to box 69, in which the user detaches the faceplate, and from there to box 65, in which the user navigates. From there the flow ends at circle 63.

Alternatively, if the answer to the query posed in diamond 67 is in the negative, then the flow proceeds to diamond 61, in which the query is posed whether the user is walking in an area remote from the vehicle. If the answer to the query posed in diamond 71 is in the negative, then the flow proceeds to box 65, in which the user navigates, and from there to end in circle 63. This situation represents the scenario in which the user has the handheld device in hand, and is planning on navigating around the vehicle. Therefore, by default, a map set of the area around the vehicle has been loaded into the handheld device, and therefore the user is able to navigate without any additional actions. However, if the user had previously selected a remote map set, then an additional step (not shown) of loading the local map set would be required prior to proceeding to box 65 to navigate. If the answer to the query posed in diamond 71 is in the affirmative, then the flow proceeds to diamond 72, in which the user is queried whether there is access to downloadable electronic maps. If the answer to the query posed in diamond 72 is in the negative, then the flow proceeds directly to end circle 63. If the answer to the query posed in diamond 72 is in the affirmative, then the flow proceeds to box 73, in which the user downloads a map set for the intended region. This situation represents the scenario in which the user is traveling away from the vehicle and either changes plans and goes to a different or additional remote location, or fails to download the correct map set for the intended traveling area. In this case, if the user has access to an electronic map set, the user may still be able to use the handheld navigation device in the remote location. Access to an electronic map set may be through a personal computer (e.g. a laptop) with a docking station or other connection for the handheld navigation device. The handheld unit may be received in a docking station that is part of a personal computer. The docking station may be adapted to receive the handheld unit and may electrically couple the handheld unit and the personal computer when the handheld unit is received in the docking station. Map information may be downloaded from the personal computer to the handheld unit when the handheld unit is received in the docking station. Position information may be uploaded from the handheld unit to the personal computer when the handheld unit is received in the docking station. Alternatively, an electronic map set may be available to the user if the user is acquainted with another person with a compatible faceplate navigation device which is provided with the ability to accommodate additional faceplate devices. A third alternative may be that an electronic dealer may provide the service of providing downloadable maps at a store or dealership. Alternative provisions for downloading electronic maps may also be possible. From box 73, the flow proceeds to box 65, in which the user navigates, and from there to end circle 63.

A detachable navigation device is provided herein. While several embodiments have been discussed, other embodiments, within the invention's spirit and scope, are also plausible.

What is claimed is:

1. A device comprising:
   a faceplate including an antenna for receiving navigation signals, a processor electrically coupled to the antenna for determining a position, a display electrically coupled to the processor for displaying navigation information, and at least one input arrangement;
   wherein the faceplate is configured to be received on a front side of a vehicular electronic unit in a dashboard of a vehicle; and
   wherein the at least one input arrangement is coupled to the vehicular electronic unit when the faceplate is received on the front side of the vehicular electronic unit.

2. The device according to claim 1, wherein the vehicular electronic unit includes at least one of a radio, a CD player, an MP3 player, a cell phone, an instant messaging system, and a game.

3. The device according to claim 1, wherein the faceplate further includes at least one electrical contact, wherein the at least one electrical contact contacts at least one further electrical contact of the vehicular electronic unit when the faceplate is received on the front side of the vehicular electronic unit.

4. The device according to claim 1, wherein a further antenna is situated in the vehicle, the further antenna electrically coupled to the processor when the faceplate is received on the front side of the vehicular electronic unit.

5. The device according to claim 1, wherein the faceplate further includes at least one of a radio, an MP3 player, a cell phone, an instant messaging system, and a game.

6. The device according to claim 1, wherein the navigation information includes at least one of:
- a first position of the user on a two-dimensional map;
- a second position of the user on a three-dimensional map;
- a diagram of an anticipated driving direction;
- at least one geographical coordinate;
- the two-dimensional map; and
- the three-dimensional map.

7. The device according to claim 1, wherein the faceplate further includes at least one of a removable memory and a permanently installed memory.

8. The device according to claim 1, wherein the at least one input arrangement is electrically coupled to the processor.

9. The device according to claim 1, wherein the faceplate further includes:
- a battery electrically coupled to at least one of the antenna, the processor, and the display;
- wherein the battery is rechargeable when the faceplate is received on the front side of the vehicular electronic unit.

10. The device according to claim 1, wherein the faceplate further includes an inertial sensor electrically coupled to the processor.

11. The device according to claim 1, wherein an inertial sensor is situated in the vehicle, the inertial sensor electrically coupled to the processor when the faceplate is received on the front side of the vehicular electronic unit.

12. A navigation system, comprising:
- a handheld unit including an antenna for receiving navigation signals, a processor electrically coupled to the antenna, a display electrically coupled to the processor for displaying navigation information, and at least one input arrangement electrically coupled to the processor;
- a further antenna situated on a vehicle for receiving navigation signals;
- a receptacle situated in a dashboard of the vehicle for receiving the handheld unit, the receptacle electrically coupled to the further antenna, the receptacle electrically coupled to the handheld unit when the handheld unit is received in the receptacle; and
- at least one electronic unit situated in the receptacle;
- wherein the at least one input arrangement is configured to operate the at least one electronic unit;
- wherein the processor determines a position using navigation signals received at the antenna when the handheld unit is not received in the receptacle; and
- wherein the processor determines a position using navigation signals received at the further antenna when the handheld unit is received in the receptacle.

13. The system according to claim 12, further comprising a data storage unit for storing at least one map set situated in the vehicle, the data storage unit electrically coupled to the handheld unit when the handheld unit is received in the receptacle.

14. The system according to claim 13, wherein the data storage unit includes a CD-ROM.

15. The system according to claim 13, wherein the at least one map set includes at least one of a two-dimensional map, a three-dimensional map, a topographic map, a road map, and a geographic coordinates map.

16. The system according to claim 15, wherein the display is a visual display showing at least one of:
- a first position of the user on the two-dimensional map;
- a second position of the user on the three-dimensional map;
- a third position of the user on the topographic map;
- a diagram of an anticipated driving direction; and
- at least one geographical coordinate.

17. The system according to claim 13, wherein the handheld unit further includes at least one of a removable memory and a permanently installed memory, the at least one of the removable memory and the permanently installed memory electrically coupled to the data storage unit when the handheld unit is received in the receptacle.

18. The system according to claim 17, further comprising:
- a personal computer including a docking station, the docking station adapted to receive the handheld unit, the docking station electrically coupling the personal computer and the at least one of the removable memory and the permanently installed memory when the handheld unit is received in the docking station;
- wherein when the handheld unit is received in the docking station, the handheld unit is able to download map information from the personal computer and is able to upload position information to the personal computer.

19. The system according to claim 17, wherein the handheld unit is able to store a personal preference profile, the personal preference profile including at least one of a personal seat position, a personal environmental control preference, and a personal preset radio station set.

20. The system according to claim 17, further comprising at least one further handheld unit.

21. The system according to claim 12, further comprising at least one further electronic unit situated in the handheld unit.

22. The system according to claim 21, wherein at least one of the at least one electronic unit and the at least one further electronic unit includes at least one of a radio, a CD player, an MP3 player, a cell phone, an instant messaging system, and a game.

23. The system according to claim 12, wherein the at least one input arrangement is configured to operate at least one function of the handheld unit.

24. The system according to claim 12, wherein the handheld unit further includes a battery electrically coupled to at least one of the antenna, the processor, and the display, the battery rechargeable when the portable handheld unit is received in the receptacle.

25. The system according to claim 12, further comprising an inertial sensor at least one of:
- situated in the handheld unit and electrically coupled to the processor; and
- situated in the vehicle and electrically coupled to the handheld unit when the handheld unit is received in the receptacle.

26. The system according to claim 12, further comprising:
- at least one electrical contact situated on the handheld unit; and
- at least one further electrical contact situated on the receptacle;
- wherein the at least one electrical contact contacts the at least one further electrical contact when the handheld unit is received in the receptacle.

27. A method for navigating a pedestrian, navigating a driver, and securing a vehicular electronic component, the method comprising:

determining by a processor whether a handheld unit is received in a dashboard receptacle, wherein the processor is situated in the handheld unit and electrically coupled to an antenna situated in the handheld unit, wherein the processor is electrically coupled to a display situated in the handheld unit, and wherein the dashboard receptacle is situated in the vehicle;

navigating the pedestrian using the antenna if the handheld unit is not received in the dashboard receptacle;

navigating the driver using a further antenna if the handheld unit is received in the dashboard receptacle, wherein the further antenna is situated on the vehicle; and operating at least one electronic unit with at least one input arrangement in the handheld unit.

28. The method according to claim 27, further comprising:

removing the handheld unit from the dashboard receptacle if the driver becomes a pedestrian; and navigating the pedestrian using the antenna.

29. The method according to claim 28, further comprising storing at least one of a local map set and a remote map set in the handheld unit prior to removing the handheld unit from the dashboard receptacle.

30. The method according to claim 29, further comprising storing the remote map set in the handheld unit by selecting a destination region prior to removing the handheld unit from the dashboard receptacle.

31. The method according to claim 27, further comprising:

inserting the handheld unit into the dashboard receptacle if the pedestrian becomes a driver; and navigating the driver using the further antenna.

32. The method according to claim 27, further comprising operating the navigation device with the at least one input arrangement in the handheld unit.

33. The method according to claim 27, further comprising determining an inertial measurement with an inertial sensor situated in at least one of the handheld unit and the vehicle, wherein the inertial measurement is for when at least one of the antenna and the further antenna is blocked from receiving positioning signals.

34. The method according to claim 27, further comprising downloading map information from a personal computer to the handheld unit when the handheld unit is received in a docking station, wherein the personal computer includes the docking station and the docking station is adapted to receive the handheld unit and electrically couples the handheld unit and the personal computer when the handheld unit is received in the docking station.

35. The method according to claim 34, further comprising uploading position information from the handheld unit to the personal computer.

\* \* \* \* \*